US012572927B2

(12) United States Patent
Pawaskar

(10) Patent No.: US 12,572,927 B2
(45) Date of Patent: Mar. 10, 2026

(54) SYSTEMS AND METHODS FOR GENERATING AND TRANSMITTING ELECTRONIC TRANSACTION ACCOUNT INFORMATION MESSAGES

(71) Applicant: Worldpay, LLC, Symmes Township, OH (US)

(72) Inventor: Sachin Pawaskar, Mason, OH (US)

(73) Assignee: Worldpay, LLC, Symmes Township, OH (US)

( * ) Notice: Subject to any disclaimer, the term of this patent is extended or adjusted under 35 U.S.C. 154(b) by 21 days.

(21) Appl. No.: 17/853,309

(22) Filed: Jun. 29, 2022

(65) Prior Publication Data

US 2022/0327523 A1 Oct. 13, 2022

Related U.S. Application Data

(63) Continuation of application No. 15/843,549, filed on Dec. 15, 2017, now Pat. No. 11,416,852.

(51) Int. Cl.
*G06Q 20/38* (2012.01)
*G06Q 20/02* (2012.01)
(Continued)

(52) U.S. Cl.
CPC ......... *G06Q 20/382* (2013.01); *G06Q 20/027* (2013.01); *G06Q 20/102* (2013.01); (Continued)

(58) Field of Classification Search
None
See application file for complete search history.

(56) References Cited

U.S. PATENT DOCUMENTS 5,815,508 A * 9/1998 Wadzinske ............ H04L 1/1877
714/704
6,542,584 B1 * 4/2003 Sherwood ............. H04M 3/533
379/211.01
(Continued)

FOREIGN PATENT DOCUMENTS

WO WO-2014071311 A1 * 5/2014 ............. G06Q 40/06
WO 2014120121 A1 8/2014
WO WO-2015095599 A1 * 6/2015 ............. G07F 9/002

OTHER PUBLICATIONS

C. Blackwell, "The management of online credit card data using the Payment Card Industry Data Security Standard," 2008 Third International Conference on Digital Information Management, 2008, pp. 838-843, doi: 10.1109/ICDIM.2008.4746843. (Year: 2008).

*Primary Examiner* — Neha Patel
*Assistant Examiner* — Jahed Ali
(74) *Attorney, Agent, or Firm* — Bookoff McAndrews, PLLC

(57) ABSTRACT

Systems and methods are disclosed for secure transmission of account information messages. One method comprises receiving account information; providing a notification to a third party regarding the account information; receiving a first request for information regarding the notification from the third party; providing a response to the third party regarding the first request; receiving data from the third party; using the data to generate a message including details about the account, wherein at least some of the details about the account are encrypted; receiving a second request for information regarding the notification from the third party; and providing the message to the third party.

20 Claims, 6 Drawing Sheets

100

PARTNER
150

DIGITAL PAYMENT PROVIDER
160

SERVICE GATEWAY
120

APPLICATION SERVER
130

MAINFRAME
140

SERVICE PROVIDER
170

USER
105

ISSUANCE SERVICE
110

(51) Int. Cl.
  *G06Q 20/10*       (2012.01)
  *G06Q 20/40*       (2012.01)
  *G06Q 30/0601*     (2023.01)

(52) U.S. Cl.
  CPC ..... *G06Q 20/4014* (2013.01); *G06Q 20/4018* (2013.01); *G06Q 30/0613* (2013.01)

(56) References Cited

U.S. PATENT DOCUMENTS

| | | | |
|---|---|---|---|
| 6,564,247 B1 | 5/2003 | Todorov | |
| 6,671,687 B1 | 12/2003 | Pederson et al. | |
| 8,392,709 B1 * | 3/2013 | Agrawal | H04L 9/3228 |
| | | | 713/169 |
| 8,874,915 B1 * | 10/2014 | Rodoper | H04L 9/0838 |
| | | | 380/278 |
| 9,161,218 B2 | 10/2015 | Bae et al. | |
| 9,806,887 B1 | 10/2017 | Campagna | |
| 10,033,489 B1 * | 7/2018 | DeMarco | H04L 69/16 |
| 10,157,400 B1 | 12/2018 | Georgi | |
| 10,298,386 B1 | 5/2019 | Lambert et al. | |
| 10,320,850 B2 | 6/2019 | Buckley et al. | |
| 10,614,462 B2 * | 4/2020 | Johnson | G07F 7/0846 |
| 11,069,358 B1 | 7/2021 | Harper | |
| 2002/0036989 A1 * | 3/2002 | Payton | H04L 45/00 |
| | | | 370/254 |
| 2002/0112152 A1 | 8/2002 | VanHeyningen et al. | |
| 2006/0031315 A1 | 2/2006 | Fenton et al. | |
| 2006/0085644 A1 * | 4/2006 | Isozaki | H04L 9/0891 |
| | | | 713/171 |
| 2006/0133278 A1 * | 6/2006 | Hill | H04L 47/10 |
| | | | 370/235 |
| 2007/0180231 A1 * | 8/2007 | Morten | H04N 21/6583 |
| | | | 348/E7.056 |
| 2007/0220009 A1 * | 9/2007 | Morris | G06F 21/6218 |
| 2007/0228148 A1 * | 10/2007 | Rable | G06Q 40/02 |
| | | | 235/379 |
| 2008/0086542 A1 | 4/2008 | Mukherjee et al. | |
| 2008/0270180 A1 * | 10/2008 | Sholtis | G16H 10/60 |
| | | | 705/2 |
| 2009/0106134 A1 | 4/2009 | Royyuru | |
| 2010/0037327 A1 | 2/2010 | Nakajima | |
| 2010/0131764 A1 | 5/2010 | Goh | |
| 2010/0169645 A1 | 7/2010 | McGrew et al. | |
| 2010/0205448 A1 | 8/2010 | Tarhan et al. | |
| 2010/0293382 A1 | 11/2010 | Hammad | |
| 2011/0270748 A1 | 11/2011 | Graham, III et al. | |
| 2011/0270761 A1 | 11/2011 | Graham, III et al. | |
| 2011/0270763 A1 | 11/2011 | Graham, III et al. | |
| 2011/0276493 A1 | 11/2011 | Graham, III et al. | |
| 2012/0084135 A1 | 4/2012 | Nissan et al. | |
| 2013/0054454 A1 * | 2/2013 | Purves | H04L 67/306 |
| | | | 705/41 |
| 2013/0060686 A1 | 3/2013 | Mersky | |
| 2013/0151400 A1 | 6/2013 | Makhotin et al. | |
| 2013/0246261 A1 | 9/2013 | Purves et al. | |
| 2013/0329889 A1 * | 12/2013 | Griffith | H04W 12/088 |
| | | | 380/270 |
| 2014/0101055 A1 | 4/2014 | Grissom et al. | |
| 2014/0164243 A1 | 6/2014 | Aabye et al. | |
| 2014/0172534 A1 * | 6/2014 | Spears | G06Q 30/06 |
| | | | 705/14.27 |
| 2014/0222688 A1 * | 8/2014 | Haggerty | G06Q 20/382 |
| | | | 705/41 |
| 2015/0019417 A1 | 1/2015 | Andrews et al. | |
| 2015/0146518 A1 * | 5/2015 | Tan | H04L 41/0604 |
| | | | 370/218 |
| 2015/0154588 A1 * | 6/2015 | Purves | G06Q 20/12 |
| | | | 705/14.27 |
| 2015/0161597 A1 | 6/2015 | Subramanian et al. | |
| 2015/0193872 A1 | 7/2015 | Ivanoff et al. | |
| 2015/0324766 A1 | 11/2015 | Park et al. | |
| 2016/0239818 A1 * | 8/2016 | Laracey | G06Q 20/363 |
| 2016/0278006 A1 | 9/2016 | Lee et al. | |
| 2017/0032362 A1 * | 2/2017 | Lahkar | G06Q 20/3674 |
| 2017/0109178 A1 | 4/2017 | Chen et al. | |
| 2017/0193497 A1 | 7/2017 | Macedo et al. | |
| 2017/0230307 A1 | 8/2017 | Li | |
| 2017/0251014 A1 | 8/2017 | Eisen | |
| 2017/0286992 A1 | 10/2017 | Lounsbury, Jr. et al. | |
| 2018/0150826 A1 | 5/2018 | Schwartz et al. | |
| 2018/0182000 A1 * | 6/2018 | Cook | G06Q 30/0279 |
| 2018/0314510 A1 | 11/2018 | Roy-Chowdhury et al. | |
| 2018/0359085 A1 | 12/2018 | Dervyn | |
| 2019/0370769 A1 | 12/2019 | Nuzum et al. | |
| 2021/0065142 A1 | 3/2021 | Batra et al. | |
| 2021/0065179 A1 | 3/2021 | Batra et al. | |
| 2021/0099292 A1 | 4/2021 | Gilton et al. | |
| 2021/0150519 A1 | 5/2021 | Wang et al. | |

* cited by examiner

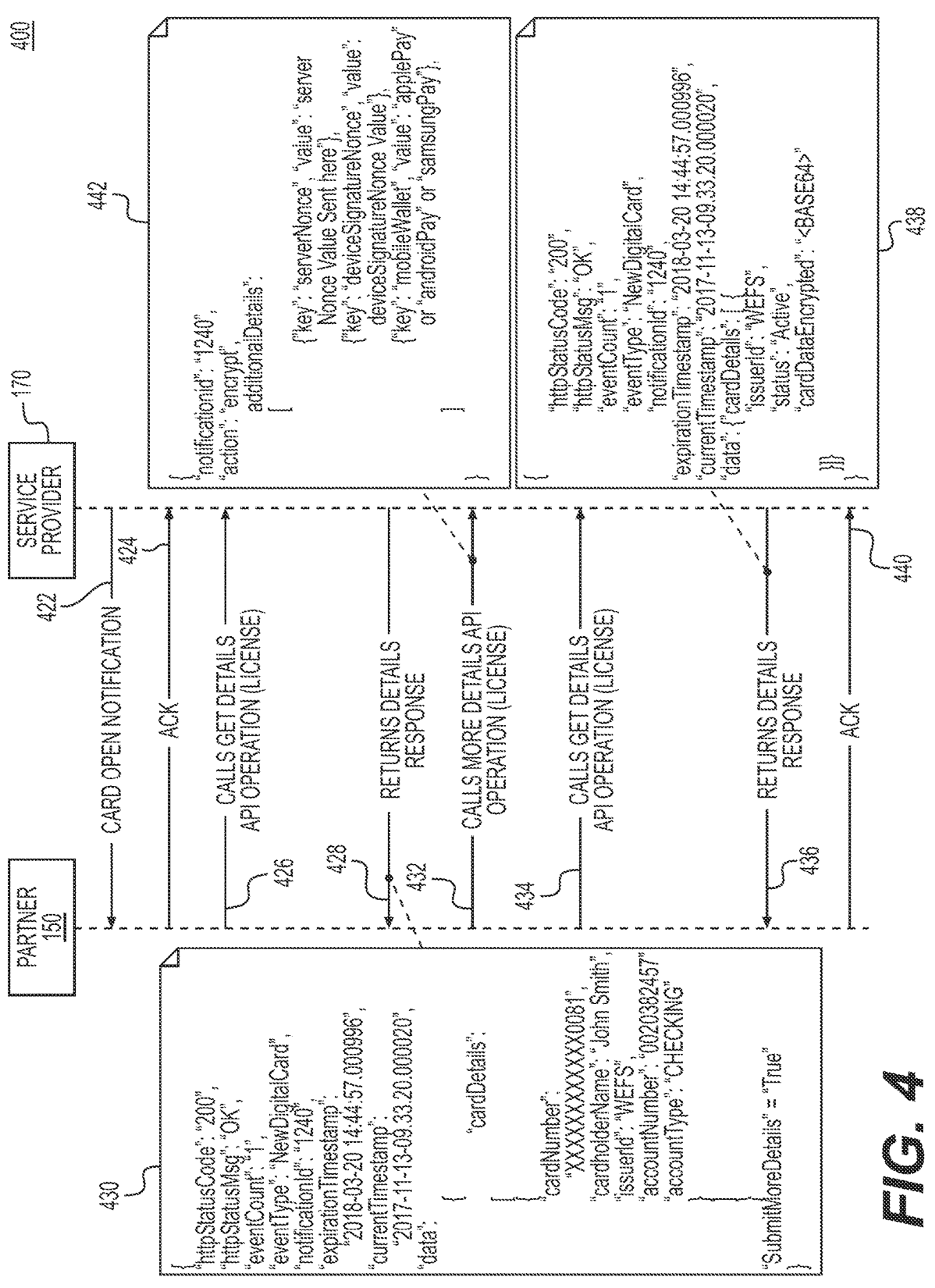

400

SERVICE PROVIDER  170

PARTNER  150

442

{
  "notificationId", "1240",
  "action", "encrypt",
  additionalDetails",
  [
    {"key", "serverNonce", "value", "server
      Nonce Value Sent here"},
    {"key", "deviceSignatureNonce", "value",
      deviceSignatureNonce Value"},
    {"key", "mobileWallet", "value", "applePay"
      or "androidPay" or samsungPay"},
  ]
}

438

{
  "httpStatusCode", "200",
  "httpStatusMsg", "OK",
  "eventCount", "1",
  "eventType", "NewDigitalCard",
  "notificationId", "1240",
  "expirationTimestamp", "2018-03-20 14:44:57.000996",
  "currentTimestamp", "2017-11-13-09.33.20.000020",
  "data", {"cardDetails", [
    "issuerId", "WEFS",
    "status", "Active",
    "cardDataEncrypted", "<BASE64>"
  ]}}
}

422    424
CARD OPEN NOTIFICATION
ACK

426
CALLS GET DETAILS
API OPERATION (LICENSE)

428    432
RETURNS DETAILS
RESPONSE

CALLS MORE DETAILS API
OPERATION (LICENSE)

434
CALLS GET DETAILS
API OPERATION (LICENSE)

436
RETURNS DETAILS
RESPONSE
ACK    440

430

{
  "httpStatusCode", "200",
  "httpStatusMsg", "OK",
  "eventCount", "1",
  "eventType", "NewDigitalCard",
  "notificationId", "1240",
  "expirationTimestamp",
    "2018-03-20 14:44:57.000996",
  "currentTimestamp",
    "2017-11-13-09.33.20.000020",
  "data",
  [
    "cardDetails",
    [
      {
        "cardNumber",
          "XXXXXXXXXXXX0081",
        "cardholderName", "John Smith",
        "issuerId", "WEFS",
        "accountNumber", "0020382457",
        "accountType", "CHECKING"
      }
    ]
  ]

"SubmitMoreDetails" = "True"
}

510 RECEIVE OPEN CARD REQUEST

520 POST OPEN CARD NOTIFICATION

530 RECEIVE DETAILS REQUEST

540 PROVIDE DETAILS RESPONSE

550 RECEIVE MORE DETAILS

560 USE MORE DETAILS RECEIVED TO GENERATE ENCRYPTED CARD DETAILS

570 RECEIVE DETAILS REQUEST

580 PROVIDE DETAILS RESPONSE

RECEIVE CARD OPEN REQUEST 510

STORE CARD INFORMATION 620

RECEIVE MORE DETAILS 530

USE MORE DETAILS TO GENERATE ENCRYPTED CARD DETAILS 640

TRANSMIT ENCRYPTED CARD DETAILS 650

600

SYSTEMS AND METHODS FOR GENERATING AND TRANSMITTING ELECTRONIC TRANSACTION ACCOUNT INFORMATION MESSAGES

CROSS-REFERENCE TO RELATED APPLICATION(S)

This patent application is a continuation of and claims the benefit of priority to U.S. Non-provisional patent application Ser. No. 15/843,549, filed on Dec. 15, 2017, the entirety of which is incorporated herein by reference.

TECHNICAL FIELD

The present disclosure relates generally to the field of inter-system computer communications and, more particularly, to providing secure transmission of electronic transactions account information between systems.

BACKGROUND

In distributed computing systems, it may be desirable to make a payment method such as a credit card, debit card, or other account available on a digital payment platform or other distributed computing systems supporting collaborative practices. Thus, it is important that such distributed systems provide mechanisms for processing requests to make a payment method available on a digital payment platform.

Existing systems may involve storage by a partner, such as a financial institution, to store data which may be subject to payment card industry ("PCP") data security standards. Such so-called PCI data is subject to increased controls for security reasons. Such data may be subject to laws, regulations, or other rules such as industry rules. Compliance with such laws, regulations, and rules may be onerous. Storage of PCI data across multiple parties may also increase security risks. Therefore, it is desirable to provide a method for making a payment method available on a digital payment platform without a partner being required to store PCI data.

Accordingly, there is a need for methods and systems for making payment information between disparate systems, including parties such as financial institutions, digital payment providers, and integrators, that are efficient, secure, and scalable.

SUMMARY

According to certain aspects of the present disclosure, systems and methods are disclosed for providing secure transmission of account information messages.

In one embodiment, a computer-implemented method is disclosed for secure transmission of account information messages. The method may comprise: receiving account information; providing a notification to a third party regarding the account information; receiving a first request for information regarding the notification from the third party; providing a response to the third party regarding the first request; receiving data from the third party; using the data to generate a message including details about the account, wherein at least some of the details about the account are encrypted; receiving a second request for information regarding the notification from the third party; and providing the message to the third party.

In accordance with another embodiment, a system is disclosed for secure transmission of account information messages. The system may comprise: a memory having processor-readable instructions stored therein; and a processor configured to access the memory and execute the processor-readable instructions, which when executed by the processor configures the processor to perform a plurality of functions, including functions to: receive account information; provide a notification to a third party regarding the account information; receive a first request for information regarding the notification from the third party; provide a response to the third party regarding the first request; receive data from the third party; use the data to generate a message including details about the account, wherein at least some of the details about the account are encrypted; receive a second request for information regarding the notification from the third party; and provide the message to the third party.

In accordance with another embodiment, a non-transitory machine-readable medium is disclosed that stores instructions that, when executed by a computer, cause the computer to form a method for secure transmission of account information messages. The method may include: receiving account information; providing a notification to a third party regarding the account information; receiving a first request for information regarding the notification from the third party; providing a response to the third party regarding the first request; receiving data from the third party; using the data to generate a message including details about the account, wherein at least some of the details about the account are encrypted; receiving a second request for information regarding the notification from the third party; and providing the message to the third party.

Additional objects and advantages of the disclosed embodiments will be set forth in part in the description that follows, and in part will be apparent from the description, or may be learned by practice of the disclosed embodiments. The objects and advantages on the disclosed embodiments will be realized and attained by means of the elements and combinations particularly pointed out in the appended claims.

It is to be understood that both the foregoing general description and the following detailed description are exemplary and explanatory only and are not restrictive of the detailed embodiments, as claimed.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

FIG. 4 is a flow chart depicting an example process for secure transmission of card information, according to one or more embodiments.

DETAILED DESCRIPTION

Figure 1:
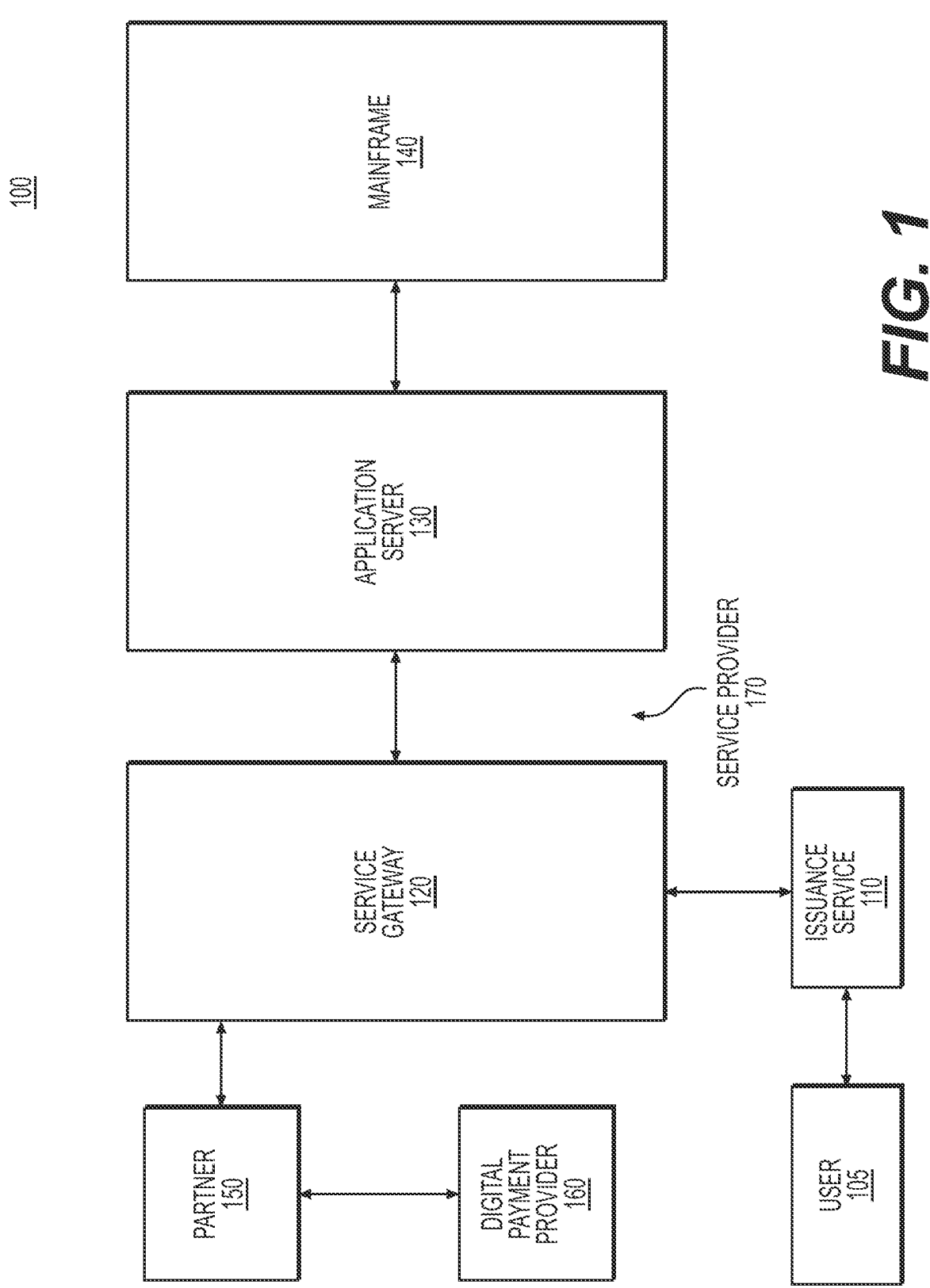
FIG. 1 depicts a block diagram of a system for secure transmission of card information, according to one or more embodiments.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

Various non-limiting embodiments of the present disclosure will now be described to provide an overall understanding of the principles of the structure, function, and use of systems and methods disclosed herein for receiving, processing, and transmitting card information to facilitate making a payment method available on a digital payment platform.

As described above, existing methods for transmitting account information regarding a payment method in distributed computing systems may suffer from high computing resource costs, high maintenance costs, and lack of security. Thus, the embodiments of the present disclosure are directed to providing scalable and secure systems and methods for transmission of account information.

Embodiments of the present disclosure include embodiments wherein a service provider receives an open card request originating from a user. A service provider may store information regarding the request and generate a notification of the open card request for transmission to a partner. Upon receiving a notification of an open card request, a partner may request details from a service provider. A service provider may provide details that are, for example, sufficient for a partner to identify an account but that do not contain PCI data. A partner may provide more details, such as nonce values, to a service provider. A service provider may make use of the nonce values and may generate encrypted information regarding a credit card, debit card, or other account. A partner may again request details from a service provider. A service provider may provide details, including the encrypted information. Because the details of a card account subject to PCI standards are encrypted, a partner is not required to store PCI data. A partner can then transmit encrypted card information to a wallet provider and/or digital payment provider for use on a digital payment platform.

One or more examples of these non-limiting embodiments are illustrated in the selected examples disclosed and described in detail with reference to FIGS. 1-6 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The actions described with regard to FIGS. 1-6 may be said to occur in real time or in close to real time. That is, the actions taken may occur over a short time frame so that the time between the first and last operation and/or step is small and/or minimized. Completing the actions described herein in real time may be desirable so that a user may make use of a card on a digital payment platform shortly after requesting that a card be made available on the digital payment platform.

FIG. 1 shows a schematic diagram of distributed computer system 100, which may include a service provider 170, along with one or more user(s) 105, issuance service(s) 110, partner(s) 150, and digital payment provider(s) 160. Service provider 170 may include a service gateway 120, an application server 130, and mainframe 140. Issuance service 110 or other components of distributed computing system 100 may also be part of service provider 170. In the alternative, issuance service 110 may be a third party. As shown in FIG. 1, in a distributed computing system 100, multiple computing systems may receive notifications or other information from other connected computing systems. For example, one or more partners 150 may receive information, such as account information, from application server 130. Partners 150 may, for example, subscribe to receive notifications from a service provider 170. In addition to general computing systems, partners 150 may include specialized computing systems. For example, in financial services systems, the partners 150 may include, for example, banks, credit card issuers, integrators, or other financial service providers.

Partner 150 may also communicate with a digital payment provider 160. Digital payment provider 160 may include services which facilitate electronic payment through, for example, smart phone applications, SMS or text messaging, computer applications, or other electronic systems. For example, digital payment provider 160 may allow a user, such as user 105, to make payments using a smart phone via near field communication or by way of a mobile app or SMS or text message. Digital payment provider 160 may store payment information such as credit or debit card information. Digital payment provider 160 may be a financial institution or may be another type of provider such as a software provider or a combination of hardware and software provider.

A user 105 may communicate with an issuance service 110. User 105 may be a holder or prospective applicant of a credit or debit card account. Alternatively, user 105 may be a financial services provider or an employee of a financial services provider. Issuance service 110 may be a financial institution, integrator, software company, or any other suitable party. Issuance service 110 may be a service that facilitates user 105 in requesting that a digital payment method be created, generated, and/or opened. Issuance service 110 may be part of service provider 170 or may be a third party. In the alternative, issuance service 110 may be omitted and user 105 may communicate directly with service gateway 120 and/or application server 130.

Communication of account information and notifications may be by way of a service gateway 120. Service gateway 120 may provide secure communication between application server 130 and partners 150. Service gateway 120 may also facilitate secure communication between issuance service 110 or user 105 and application server 130 and/or partners 150. Interaction between service gateway 120 and partners 150, issuance service 110, and/or user 105 may be according to specified APIs providing, for example, topic subscription, notification messaging, and account information. These APIs will be discussed in further detail below. Interfacing with the service gateway API may allow the application server API to be modified without disturbing the implementation of partner 150. Similar API abstractions may be published for APIs published by partners 150 or by issuance service 110. Security protocols provided by the service gateway and application server may include, for example, message authentication codes (MAC), JavaScript Object Notation (JSON) Web Tokens (JWT), or secure Hypertext Transfer Protocol Secure (HTTPS), etc. In the alternative, service gateway 120 may be omitted and partner (s) 150, issuance service(s) 110, and/or user(s) 105 may communicate directly with application server 130. In the discussion below, operations involving service gateway 120 may instead omit service gateway 120.

Application server 130 may be in communication with mainframe 140. Mainframe 140 may include one or more databases. Mainframe 140 may store information about, for example, partners 150, subscriptions, events, notifications, etc. In the alternative, application server 130 may be in direct communication with one or more databases.

Figure 2:
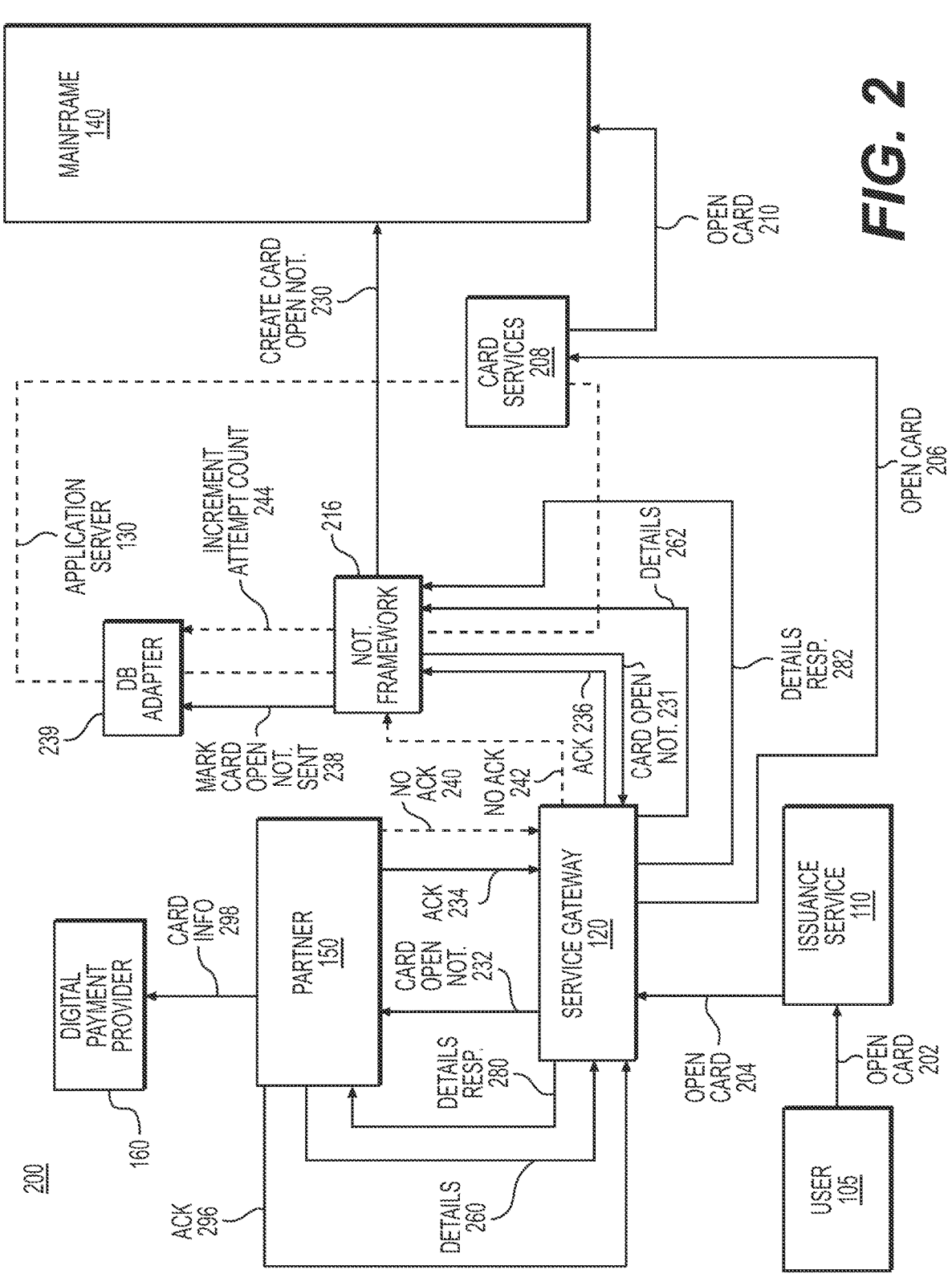
FIG. 2 is a flow chart depicting an example process for secure transmission of card information, according to one or more embodiments.

FIG. 2 is a flow diagram depicting an exemplary method 200 for receiving, processing, and transmitting account information, requests for information, and notifications. The transmission of account information, requests for information, and notifications may be said to be completed in real time. As shown in FIG. 2, a partner distributed computing system, such as partner 150 depicted in FIG. 1, may communicate with a server, such as application server 130 depicted in FIG. 1, with or without mediation by an additional gateway system, such as service gateway 120 as depicted in FIG. 1. Routing communications between the service provider 170 and partners 150 via service gateway 120 may reduce the number of rules that are put in place for network pathways.

User 105 may submit an open card request 202 to issuance service 110. Open card request 202 may be a request by user 105 to make an account available for use in a digital payment system, for example on a smartphone, as described above. Open card request 202 may be a request to make an existing account available for use in a digital payment system. For example, user 105 may enter information regarding an existing credit or debit card or checking account into a portal associated with issuance service 110. In the alternative, information may be entered over the telephone; in person; by scanning, swiping, or otherwise recognizing a card in a smart phone, point of service ("POS") terminal, or other input device; or by any other method. Information may include an account number, card verification value ("CVV"), card expiration date, accountholder information (including name, address, and/or phone number), and/or other information pertaining to an account. In the alternative, open card request 202 may be a request to open a new account with a financial services provider or other entity. An open card request 202 for a new account may be made in a manner similar to that utilized for an existing account, as described above.

Issuance service 110 may then transmit an open card message or notification in operation 204 to service gateway 120 or any other component of service provider 170, for example application server 130. If service gateway 120 is utilized, then an open card message or notification may be transmitted by service gateway 120 to a component of application server 130 in operation 206. For example, service gateway 120 may transmit an open card message or notification to card services component 208 of application server 130 in operation 206. Card services component 208 or any other suitable component of application server 130 may then transmit an open card message or notification to mainframe 140.

In operation 230, a component of application server 130 such as notification framework component 216 may monitor component(s) of mainframe 140 and may receive or create a card open notification. In operation 231, a component of application server 130, such as notification framework component 216, may transmit a card open notification to service gateway 120. If service gateway 120 is not utilized, a card open notification may be transmitted directly from application server 130 to partner 150. Service gateway 120 may provide a card open notification to partner 150 in operation 232. As discussed in further detail below with regard to FIG. 3, a card open notification may inform partner 150 of the user's card open request made in operation 202.

In operation 234, a service gateway 120 or application server 130 may receive an acknowledgement from partner 150 of a notification, such as a card open notification transmitted in operation 232, as discussed above. In operation 236, service gateway may transmit an acknowledgment to a component of application server 130, such as notification framework component 216 indicating, for example, that partner 150 has provided an acknowledgment in operation 234. A component of application server 130, such as notification framework component 216, may, in operation 238, indicate to a component of application server 130 such as database adapter 239 that a card open notification may be marked as sent. For example, notification framework component 216 may instruct a component of application server 130 such as database adapter 239 to mark a card open notification as sent.

In operation 240, service gateway 120 or application server 130 may fail to receive an acknowledgment from partner 150 of receipt of a notification such as a card notification transmitted in operation 232, as discussed above. In the alternative, service gateway 120 or application server 130 may receive an error message from partner 150 or may not receive any message. In operation 242, service gateway 120 may notify a component of application server 130 such as notification framework component 216 that an acknowledgment has not been received. Notification framework 216 may indicate to a component of application server 130 such as database adapter 239 to increment an attempt count for transmitting a notification such as the card open notification transmitted in operation 232. Application server 130 and/or service gateway 120 may attempt to again deliver a card open notification to partner 150 or may wait a longer duration for an acknowledgment. Notification framework 216 (or another component of application server 130) may continue to communicate with database adapter 239 (or another component of application server 130) in order to continue incrementing the attempt count. Once a certain count is reached, application server 130 and/or service gateway 120 may cease attempting to deliver a card open notification to partner 150.

In operation 260, partner 150 may submit a details request regarding a cardholder, a card open notification, an account, or other information from service gateway 120 of service provider 170. In the alternative, some or all details may be transmitted to partner 150 along with a card open notification in operation 232.

In operation 262, service gateway 120 may transmit a details request to a component of application server 130 such as notification framework component 216. In operation 282, a component of application server 130 such as notification framework component 216 may transmit to service gateway 120 one or more details response(s). A details response transmitted in operation 282 may include information regarding, for example, a cardholder, a card number, an account, a status, a timestamp, and/or a CVV, among other information. Some or all of the information in a "notification details" response transmitted in operation 282 may be encrypted, masked, or incomplete. Information subject to PCI laws, regulations, or other rules may not require storage by a partner 150. Service gateway 120 may transmit a details response such as a "notification details" response to partner 150 in operation 280.

In operation 298, partner 150 may transmit card information to a digital payment provider 160. The card information transmitted in operation 298 may include all of the information necessary for an account such as a credit card, debit card, checking account, or savings account to be used on a digital payment platform. In operation 296, an acknowledgment may be sent from partner 150 to service gateway 120. An acknowledgment transmitted in operation 296 may, for example, indicate that partner 150 has sent card information to digital payment provider 160 or that partner 150 has received a details response such as a "notification details" response transmitted in operation 282.

Figure 3:
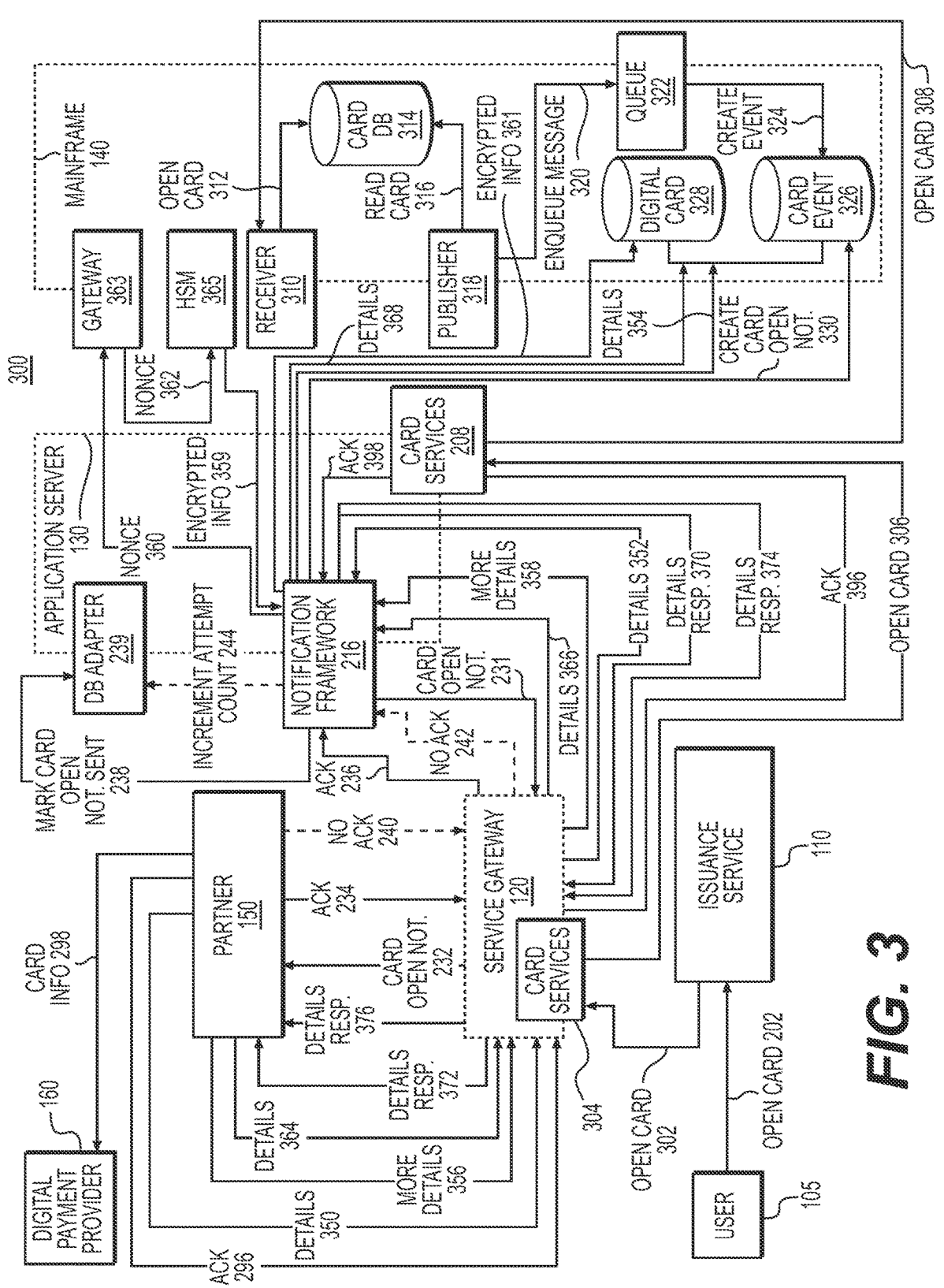
FIG. 3 is a flow chart depicting an example process for secure transmission of card information, according to one or more embodiments.

FIG. 3 is a flow chart describing a further exemplary method 300 for receiving, processing, and transmitting account information, requests for information, and notifications.

A user such as user 105 as described with regard to FIG. 1 may submit to an issuance service such as issuance service 110 described with regard to FIG. 1 an open card request such as request 202 as described with regard to FIG. 2. In operation 302, issuance service 110 may transmit an open card message or notification to service gateway 120, for example to card services component 304 of service gateway 120. Card services component 304 or another component of service gateway 120 may transmit an open card message or notification in operation 306 to a server such as application server 130 as described with regard to FIG. 1. For example, an open card message or notification in operation 306 may be transmitted to a card services component 208 of application server 130 as described with regard to FIG. 2.

A component of application server 130 such as card services component 208 may then in operation 308 transmit an open card request to a component of a mainframe such as mainframe 140 described with regard to FIG. 1. For example, an open card message or notification transmitted in operation 308 may be transmitted to a receiver component 310 of mainframe 140. Receiver component 310 may operate to communicate with other components of mainframe 140.

Receiver 310 or another component of mainframe 140 may in operation 312 transmit an open card message or notification to a component of mainframe 140 such as card database 314. A card database 314 may be a single database table or may include multiple tables. Operation 312 may serve to open a card as requested by a user 105 in operation 202.

In operation 316, a component of mainframe 140 such as publisher 318 may read the card information from card database. In operation 320, a message regarding the card opening may be queued in a component such as queue 322 of mainframe 322. In the alternative, operation 320 and queue 322 may be omitted. In operation 324, an event may be created in a component such as card event database 326 of mainframe 140. Event database 326 may be a single database table or may include multiple tables. Event database 326 and card database 314 may be part of the same database or may be separate databases. An event created in operation 324 may be a notification of a card being opened, for example as requested by a user 105 in operation 202. Alternatively, an event created in operation 324 may be other information regarding a card opening or other event.

In operation 330, a card open notification may be created by and/or transmitted to a component of an application server 130 such as notification framework component 216 as described with regard to FIG. 2. A component of application server 130 such as notification framework component 216 may monitor the contents of card event database 326. For example, notification framework component 216 may monitor the contents of card event database 326 at specified time intervals. In the alternative, card event database 326 may push notifications to a component of application server 130 such as notification framework component 216 when information in event database 326 is updated or created.

In operation 231, a card open notification may be transmitted to a service gateway 120 from a component of application server 130 such as notification framework component 216. Operation 231 may be omitted if a service gateway 120 is not utilized. In operation 232, a card open notification may be transmitted to a partner 150. A card open notification transmitted to a partner 150 in operation 232 may include information that a card or other account has been opened, a notification ID, a timestamp, an expiration timestamp, and/or additional information regarding the notification. In addition or in the alternative, a card open notification transmitted to a partner 150 in operation 232 may include certain card information such as an account holder name, masked card information, some digits of a card number (e.g., the last four digits) as specified by laws, regulations, or other rules such as industry rules, a user id, an account number (which may be different from the card number), and/or an account type.

As discussed with regard to FIG. 2, in operation 234, a service gateway 120 may receive a message or other communication acknowledging that a partner 150 has received a card open notification transmitted in operation 232. Upon receiving an acknowledgment in operation 234, service gateway 120 may, in operation 236, notify event application server 130 that an acknowledgment has been received from a partner 150. In operation 234, service gateway 120 may communicate the acknowledgment to notification framework component 216 or any other suitable component of the application server 130. In the alternative, service gateway 120 may not be utilized, and notification framework component 216 or any other suitable component of the application server 130 may receive acknowledgment from a partner 150. In operation 238, a component of application server 130 such as notification framework 216 may mark a card notification as being sent in a component of application server 130 such as database adapter 239.

As discussed with regard to FIG. 2, in operation 240, service gateway 120 or whichever portion of service provider 170 is in communication with partner 150 may register that an acknowledgment message has not been received from a partner 150. In the alternative, in operation 240, service gateway 120 may receive an error message or other notification from partner 150 that the 150 did not receive the card open notification. In the alternative, service gateway 120 may not receive any message from partner 150.

If an acknowledgment message is not received from a partner 150 within the relevant time period, or the card open notification is otherwise not acknowledged, then service gateway 120 may notify application server 130 in operation 242 that an acknowledgment was not received, as discussed with regard to FIG. 2. This notification may be received by, for example, notification framework component 216 or any other suitable component of application server 130, as discussed with regard to FIG. 2. In operation 244, a component of application server 130 such as notification framework 216 may increment an attempt count in a component of application server 130 such as database adapter 239. The steps of operations 232, 236, 238, 240, 242, and/or 244 may be repeated. The number of times an attempt count may be incremented as in operation 244 may be limited. For example, after an attempt count is incremented, for example, three times, step 232 may not be repeated. The number of times an attempt count may be incremented may be any suitable number which may be preconfigured for partner 150.

In operation 350, partner 150 may request details regarding a cardholder, an open card notification, an account, or other information from service gateway service 120 or another component of service provider 170. In the alternative, some or all details may be transmitted to partner 150 along with a card open notification in operation 232.

In operation 352, service gateway 120 may transmit a details request to a component of application server 130 such as notification framework component 216. In operation 354, a component of application server 130 such as notification framework component 216 may transmit a details request to one or more components of mainframe 140 such as digital card database 328 and/or card event database 326 and may in turn receive details from components such as digital card database 328 and/or card event database 326. Digital card database 328 may include one or more tables. Card event database 326 and digital card database 328 may be tables in the same database or may be separate databases.

In operation 370, a component of application server 130 such as a notification framework 216 may transmit a details response to a service gateway 120. In operation 372, a service gateway 120 may transmit a details response to a partner 150. In the alternative, a service gateway 120 may not be utilized and a component of application server 130 such as notification framework 216 may transmit a details response to a partner 150. A details response such as a "notification details" response transmitted in operation 372 may include sufficient details for a partner 150 to identify an account. For example, a details response transmitted in operation 372 may include, for example, a status code, a message status, an event count, an event type, a notification ID, an expiration timestamp, a current timestamp, a portion of a card number (e.g., the last four digits), a masked card number, a cardholder name, an issuer ID, an account number (which may be different from an account number), an account type, and a flag about whether additional data is required.

In operation 356, a partner 150 may submit more details to a service provider 170 via, for example, a service gateway 120. For example, in operation 356, a partner 150 may submit information such as keys (e.g., a server nonce value and a device signature nonce value) and which digital payment platform is involved in operation 356. In operation 358, a service gateway 120 may transmit more details, as may have been obtained in operation 356, to a component of application server 130 such as notification framework 216.

In operation 360, a component of application server 130 such as notification framework 216 may transmit some or all of a more details submission to a component of mainframe 140 such as gateway 363. For example, in operation 360, notification framework 216 may transmit one or more nonce values to a component of mainframe 140 such as gateway 363. In operation 362, gateway 363 may submit information such as one or more nonce values to a component of mainframe 140 such as a hardware security module ("HSM") 365. HSM 365 may have components such as PCI express cards physically installed in a processor frame such as an I/O cage. HSM 365 (or another component) may use the nonce value(s) submitted to HSM 365 in operation 362 and/or other components of more details received from a partner 150 in operation 356 to compile encrypted information including card details. In operation 359, HSM or another component may transmit the encrypted information to a component of the application server 130 such as notification framework 216. In operation 361, notification framework 216 may store the encrypted information in a component of mainframe 140 such as digital card database 328. The information stored in digital card database 328 may be encrypted, and partner 150 may not be able to access the encrypted information.

A partner 150 may request details from a component of service provider 170 such as service gateway 120 in operation 364. A request submitted in operation 364 may be a request for encrypted information sufficient to utilize a card or other account with a digital payment platform. In operation 366, a details request may be transmitted from a service gateway 120 to a component of application server 130 such as notification framework 216. In operation 368, a component of application server 130 such as notification framework 216 may transmit a details request to one or more components of mainframe 140 such as digital card database 328 and/or card event database 326 and may receive details from one or more of digital card database 328 and/or card event database 326. For example, in operation 368, notification framework 216 may request and receive encrypted information regarding a card and/or other account from digital card database 328 and/or card event database 326.

In operation 374, a component of application server 130 such as notification framework 216 may transmit a details response to a service gateway 120. A details response such as a "notification details" response transmitted in operation 374 may include encrypted information regarding a card and/or other account. In operation 376, service gateway 120 may transmit a details response to partner 150. In the alternative, a service gateway 120 may not be used and operation 374 may be omitted so that application server 130 provides a details response directly to partner 150 in operation 376. A details response transmitted to partner 150 in operation 376 may include encrypted card and/or account information. For example, a details response transmitted in operation 376 may include information regarding, for example, a status code, an event count, an event type, an expiration timestamp, a current timestamp, and card details. Card details may be encrypted and may include cardholder information, a card number, an account number and/or a CVV. A partner 150 may be unable to decode encrypted information transmitted in operation 376. Additionally or alternatively, a partner 150 may not be required to store information subject to PCI laws, regulations, or rules.

In operation 298, partner 150 may transmit card information to a digital payment provider 160. Card information transmitted in operation 298 may be encrypted and may be information sufficient to make use of a card and/or other account via a digital payment provider. Card information transmitted in operation 298 may be the same as the information transmitted in details response 376 or may be different. For example, partner 150 may add or remove information before transmitting card information in operation 298. Additionally or alternatively, in operation 298, a partner 150 may transmit only the encrypted portion of the information transmitted in operation 376.

In operation 296, a partner may provide an acknowledgment of receipt of the details response transmitted in operation 376 and/or confirmation of transmission of card information to a digital payment provider in operation 298. An acknowledgment provided in operation 296 may be transmitted to a service gateway 120 and/or another component of a service provider 170. In operation 396, service gateway 120 may transmit an acknowledgment to a component of application server 130 such as card services component 208. In operation 398, card services component 208 may transmit an acknowledgment to a component of application server 130 such as notification framework 216. In the alternative, operation 396 may be omitted, and a service gateway 120 may transmit an acknowledgment to notification framework component 216. In an operation not shown in FIG. 3, notification framework component 216 may optionally instruct a component of application server 130 such as database adapter 239 to mark a details response such as the details response transmitted in operation 376 as sent or to mark card info as having been transmitted such as in operation 298.

In operation 298, partner 150 may transmit card information to digital payment provider 160. The card information transmitted in operation 298 may include all of the information necessary for an account such as a credit card, debit, checking, or savings account to be used on a digital payment platform, such as that described above. In operation 296, an acknowledgment may be sent from partner 150 to service gateway 120. An acknowledgment transmitted in operation 296 may, for example, indicate that partner 150 has sent card info to digital payment provider 160.

FIG. 4 depicts a process flow diagram for a process 400 for requesting and transmitting details regarding a card open notification between a partner such as partner 150 described with regard to FIG. 1 and a service provider such as service provider 170 described with regard to FIG. 1. The communications described below may be mediated by, for example, a service gateway such as service gateway 120 described with regard to FIG. 1 (not shown). In operation 422, service provider 170 may post a card open notification. Operation 422 may be the same as or similar to operation 232 described with regard to FIGS. 2 and 3 and may contain the information described above with regard to operation 232. For example, a card open notification posted in operation 422 may include information regarding a request from a user 150 to open a card. Opening a card may include making a credit card, debit card, or other account available for use on a digital payment platform. Partner 150 may be able to access the card open notification posted in operation 422. The card open notification posted in operation 422 may be made via, for example, JWT. In operation 424, partner 150 may acknowledge receipt of, for example, the card open notification posted in operation 422 to service provider 170. For example, a partner 150 may call an acknowledge notification API operation (license). Operation 424 may be the same as or similar to operation 234 as described with regard to FIGS. 2 and 3.

In operation 426, partner 150 may request details from service provider 170. A details request of operation 426 may be the same as or similar to a details request 350 as described with regard to FIG. 3. Partner 150 may request details in operation 426 by calling a get notification details API operation (license).

In operation 428, service provider 170 may provide a details response to partner 150. Operation 428 may be the same as or similar to operation 372 as described with regard to FIG. 3. A details response such as details response 430 may be provided in operation 428. Details response 430 may include, for example, a status code, a status message, an event count, an event type, a notification ID, an expiration timestamp, a current timestamp, and data such as card details, a card number, a cardholder name, an issuer ID, an account number, and an account type. Information such as a card number may be fully or partially masked. For example, details response 430 may include only certain digits of a card number (e.g., the last four digits). An account number and a card number may be different identifiers. For example, an account number may be a number used internally by partner 150. Details response 430 may also include a flag requiring a partner 150 to submit additional details. Such a flag may be set to true or false. For example, as depicted in FIG. 4, a flag is set to request more details in details response 430.

In operation 432, a partner 150 may submit more details to a service provider 170. Operation 432 may be the same as or similar to operation 356 as described with regard to FIG. 3. For example, in operation 432, a partner 150 may call a get more details API operation (license). In operation 432, a partner may provide, for example, a more details submission 442. A more details submission 442 may include, for example, a notification ID (which may be the same as the notification ID described with regard to details response 430), an action, and additional details. An action may include, for example, an encrypt action. Additional details may include one or more keys. Keys can include, for example, a server nonce value, a device signature nonce value, and an identification of a digital payment platform.

In operation 434, a partner 150 may request details from a service provider 170. Operation 434 may be the same as or similar to operation 364 as described with regard to FIG. 3. For example, partner 150 may call a get details API operation (license). In operation 436, service provider 170 may provide a details response to partner 150. Operation 436 may be the same as or similar to operation 376 as described with regard to FIG. 3. In operation, a service provider 170 may provide, for example, details response 438. Details response 438 may include, for example, a status code, a status message, an event count, an event type, a notification ID (which may be the same as the notification ID of details response 430 and more details submission 442), an expiration timestamp, a current timestamp, and data such as card details including an issuer ID, a status, and card data. Card data may be encrypted. For example, card data may be encrypted using a Base 64 encoding scheme. Encryption of card data may mean that partner 150 does not have to store data subject to PCI laws, regulations, or other rules. Transmission of notification details response 438 in operation 436 may be conditioned on validation steps. For example, a service provider 170 may return a notification details response in operation 436 only if a notification has not expired (e.g., if an expiration timestamp has not passed) and if a query string includes information such as card details in pass fields.

In operation 440, a partner 150 may acknowledge receipt of a details response such as details response 438 transmitted in operation 436. For example, a partner 150 may call an acknowledge notification API operation (license). Operation 440 may be the same as or similar to operation 296 as described with regard to FIGS. 2 and 3.

Figure 5:
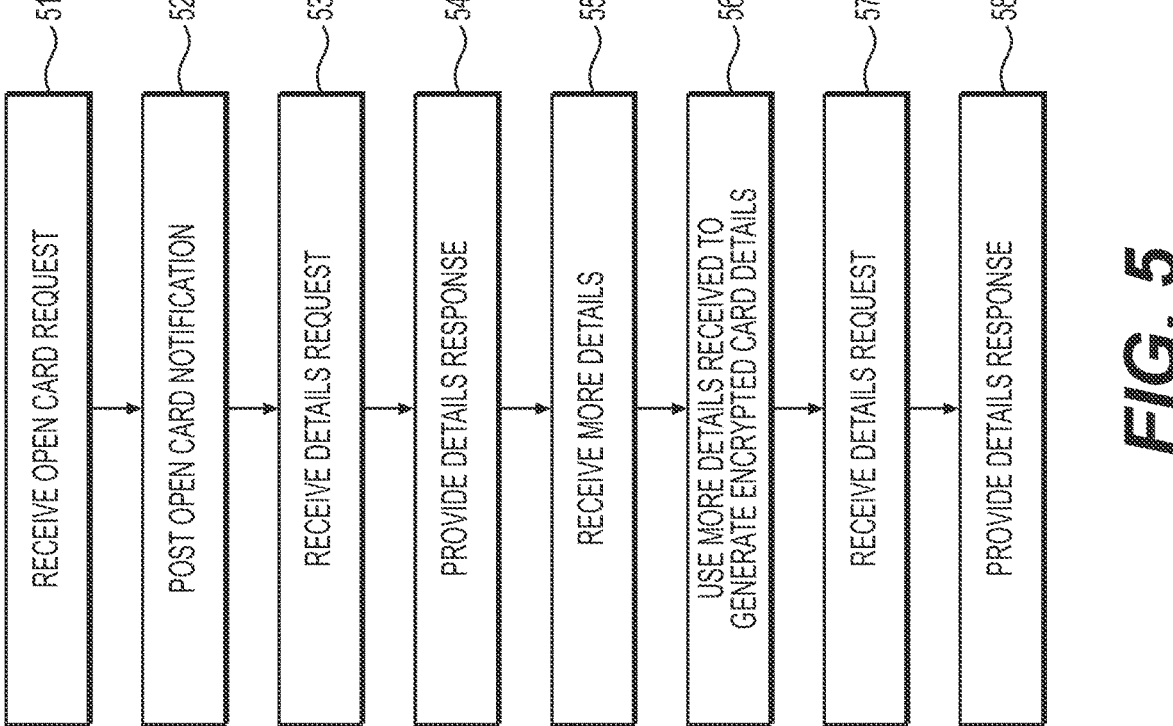
FIG. 5 is a process flow diagram depicting an example method for secure transmission of card information, according to one or more embodiments.

FIG. 5 shows a process flow diagram for a process 500 for providing information regarding a credit card, debit card, or other account. The order of steps described herein is exemplary only and the steps may be performed in additional order with fewer or more steps than described. The communications described herein may be mediated by a service gateway such as service gateway 120 as described with regard to FIG. 1. In step 510, a service provider such as service provider 170 as described with regard to FIG. 1 may receive an open card request. An open card request may be generated as described above or by other methods.

In step 520, a service provider 170 may post an open card notification. For example, service provider 170 may post an open card notification via a service gateway such as service gateway 120. Step 120 may be similar to or the same as operations 231 and/or 232 as described with regard to FIGS. 2 and 3 and/or operation 422 as described with regard to FIG. 4. A partner such as partner 150 as described with regard to FIG. 1 may receive the open card notification posted in step 520. Partner 150 may call an API to retrieve an open card notification or an open card notification may be pushed to partner 150. An open card notification may include information sufficient to inform a partner that an open card request has been made. An open card notification may include information described with regard to operations 231, 232, and/or 422.

In step 530, a service provider 170 may receive a details request from, for example, partner 150. A details request may be the same as or similar to a details request described with regard to operation 260 as described with regard to FIG. 2, operation 350 as described with regard to FIG. 3, and/or operation 426 as described with regard to FIG. 4.

In step 540, a service provider 170 may provide a details response to a partner 150. A details response as provided in step 540 may be the same as or similar to a details response provided in operation 280 as described with regard to FIG. 2, operation 372 as described with regard to FIG. 3, and/or operation 428 (transmitting, e.g., details response 430) as described with regard to FIG. 4.

In step 550, a service provider 170 may receive more details from a partner 150. Step 550 may be the same as or similar to operation 356 as described with regard to FIG. 3 and/or operation 432 (submitting more details submission 442) as described with regard to FIG. 4.

In step 560, a service provider 170 may use some or all elements of a more details submission such as more details submission 442 in order to generate encrypted card details. Step 560 may include, for example, operations the same as or similar to operations 358, 360, and/or 362 as described with regard to FIG. 2. In step 560, a service provider may encrypt card information that would be subject to PCI laws, regulations, or other rules.

In step 570, a service provider 170 may receive a details request from partner 150. Step 570 may be the same as or similar to operation 260 as described with regard to FIG. 2, operation 364 as described with regard to FIG. 3 and/or operation 434 as described with regard to FIG. 4.

In step 580, a service provider 170 may provide a details response. Step 580 may be the same as or similar to operation 280 as described with regard to FIG. 2, operation 376 as described with regard to FIG. 3, and/or operation 436 (transmitting details response 438) with regard to FIG. 4.

Figure 6:
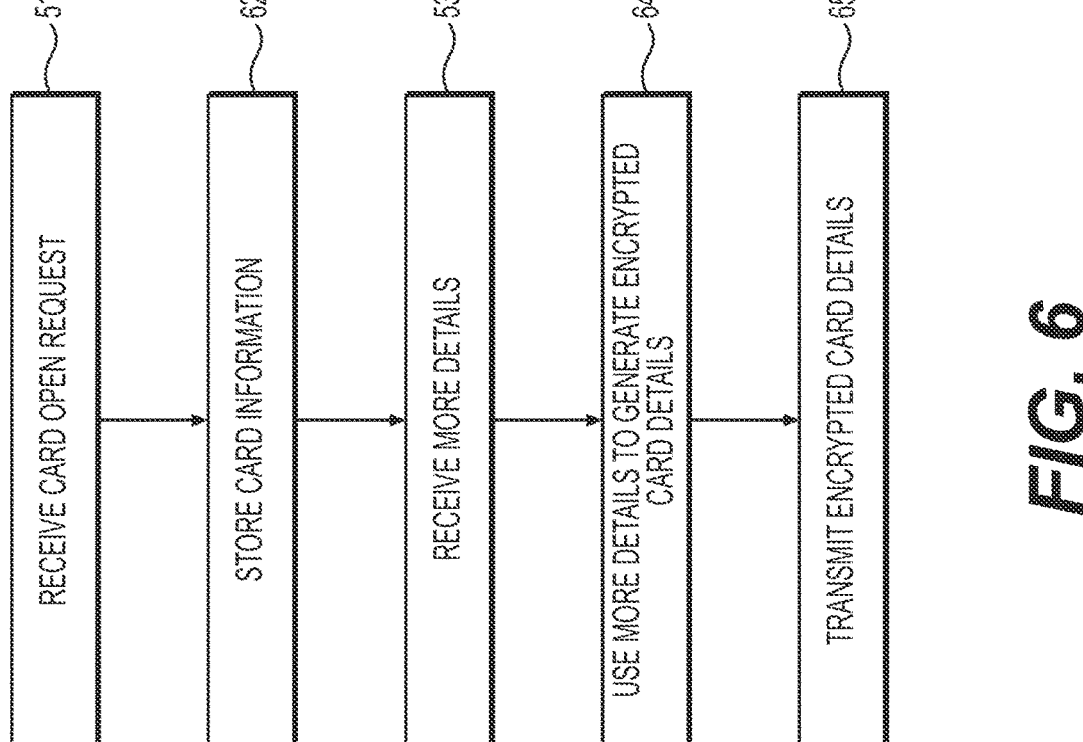
FIG. 6 is a process flow diagram depicting an example method for secure transmission of card information, according to one or more embodiments.

FIG. 6 depicts a process flow diagram for a process 600 for processing and transmitting card open requests. The order of steps described herein is exemplary only and the steps may be performed in additional order with fewer or more steps than described. The communications described herein may be mediated by a service gateway such as service gateway 120 as described with regard to FIG. 1. In step 510, as described with regard to FIG. 5, a service provider such as service provider 170 as described with regard to FIG. 1 may receive an open card request. An open card request may be generated as described above or by other methods.

In step 620, a service provider 170 may store card information. The card information stored in step 170 may originate from the open card request or may originate from information possessed by service provider 170 or from information possessed by a third party. Step 520 may be the same as or similar to operations 312, 316, 320, and/or 324 as described with regard to FIG. 3.

In step 530, as described with regard to FIG. 5, a service provider 170 may receive more details from a partner 150. Step 550 may be the same as or similar to operation 356 as described with regard to FIG. 3 and/or operation 432 (submitting more details submission 442) as described with regard to FIG. 4.

In step 640, a service provider 170 may use some or all elements of a more details submission such as more details submission 442 and/or the card information stored in step 620 in order to generate encrypted card details. Step 640 may be the same as or similar to step 560 and may include, for example, operations the same as or similar to operations 358, 360, and/or 362 as described with regard to FIG. 2. For example, a service provider may encrypt card information which would be subject to PCI laws, regulations, or other rules.

In step 650, a service provider 170 may transmit encrypted card details to a partner 150. Step 650 may be the same as similar to details response step 580 as described with regard to FIG. 5 and may be the same as or similar to details response operation 280 as described with regard to FIG. 2, details response operation 376 as described with regard to FIG. 3, and/or details response operation 436 (transmitting details response 438) with regard to FIG. 4.

These and other embodiments of the systems and methods may be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of operations performed in the execution of a method does not imply that those operations must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

It is intended that the specification and examples be considered as exemplary only, with a true scope and spirit of the invention being indicated by the following claims.

What is claimed is:

1. A computer-implemented method comprising:
   receiving, by an issuance service, a request from a device associated with at least one user, wherein the request includes an open account request;
   transmitting, by the issuance service, a first notification regarding the request, via a service gateway, to an application server;
   providing, by the service gateway, a secure application programming interface (API) abstraction layer configured to translate partner-specific API requests into a format compatible with the application server, wherein the secure API abstraction layer facilitates scalable communication between the application server and partner distributed computing system;
   transmitting, by the application server, the first notification regarding the request to a mainframe system, wherein the application server monitors a database of the mainframe system for receiving a second notification;
   transmitting, by the application server, the second notification regarding the request, via the service gateway, to the partner distributed computing system, wherein the second notification includes account information regarding an account opened for use on a digital payment platform;
   determining, by the service gateway, a failure in receiving a confirmation from the partner distributed computing system within a pre-determined time threshold;
   iterating, by the application server, a sequence of operations including (i) transmitting the second notification to the partner distributed computing system, (ii) registering a failure event upon detecting the failure in receiving the confirmation, and (iii) notifying the application server of the failure to increment an attempt count for transmitting the second notification based on a threshold attempt count limit;
   determining, by the application server, to cease the attempt count for transmitting the second notification to the partner distributed computing system based on determining the threshold attempt count limit has been exceeded;
   transmitting, by the partner distributed computing system, a request for additional information, via the service gateway, to the application server;
   encrypting, by the application server, the additional information using an encoding scheme;
   transmitting, by the application server, the encrypted additional information, via the service gateway, to the partner distributed computing system upon determining a timestamp associated with the request for additional information has not expired;
   receiving, by the application server, the confirmation and one or more nonce values from the partner distributed computing system based, at least in part, on identification and association of the account with the at least one user;
   encrypting, by a service provider, the account information utilizing the encoding scheme based, at least in part, on the one or more nonce values; and
   transmitting, by the service provider, the encrypted account information to a device associated with a digital payment provider.

2. The method of claim 1, wherein transmitting the second notification, further comprising:
   storing the account information regarding the account opened for use on the digital payment platform; and
   generating the second notification based, at least in part, on the stored account information.

3. The method of claim 1, wherein the threshold attempt count limit is preconfigured for the partner distributed computing system.

4. The method of claim 1, further comprising:
   monitoring, one or more events regarding opening of a plurality of accounts for use on the digital payment platform, at specified time intervals; and transmitting one or more notifications to the partner distributed computing system upon determining an update or a change in the one or more events.

5. The method of claim 1, wherein the one or more nonce values include a server nonce value and a device signature nonce value.

6. The method of claim 5, wherein the one or more nonce values are received from the partner distributed computing system in real-time or near real-time, and wherein the account information is encrypted in real-time or near real-time.

7. The method of claim 1, wherein the open account request includes opening a bank account, a credit card account, a debit card account, or a combination thereof for the at least one user.

8. The method of claim 1, wherein the account information is encrypted using a Base64 encoding scheme.

9. A computer system comprising:

one or more memories storing processor-executable instructions that, when executed by one or more processors, cause the one or more processors to facilitate operations comprising:

receive, by an issuance service, a request from a device associated with at least one user, wherein the request includes an open account request;

transmit, by the issuance service, a first notification regarding the request, via a service gateway, to an application server;

provide, by the service gateway, a secure application programming interface (API) abstraction layer configured to translate partner-specific API requests into a format compatible with the application server, wherein the secure API abstraction layer facilitates scalable communication between the application server and partner distributed computing system;

transmit, by the application server, the first notification regarding the request to a mainframe system, wherein the application server monitors a database of the mainframe system for receiving a second notification;

transmit, by the application server, the second notification regarding the request, via the service gateway, to the partner distributed computing system, wherein the second notification includes account information regarding an account opened for use on a digital payment platform;

determine, by the service gateway, a failure in receiving a confirmation from the partner distributed computing system within a pre-determined time threshold;

iterate, by the application server, a sequence of operations including (i) transmitting the second notification to the partner distributed computing system, (ii) registering a failure event upon detecting the failure in receiving the confirmation, and (iii) notifying the application server of the failure to increment an attempt count for transmitting the second notification based on a threshold attempt count limit;

determine, by the application server, to cease the attempt count for transmitting the second notification to the partner distributed computing system based on determining the threshold attempt count limit has been exceeded;

transmit, by the partner distributed computing system, a request for additional information, via the service gateway, to the application server;

encrypt, by the application server, the additional information using an encoding scheme;

transmit, by the application server, the encrypted additional information, via the service gateway, to the partner distributed computing system upon determining a timestamp associated with the request for additional information has not expired;

receive, by the application server, the confirmation and one or more nonce values from the partner distributed computing system based, at least in part, on identification and association of the account with the at least one user, wherein the one or more nonce values include a server nonce value and a device signature nonce value;

encrypt, by a service provider, the account information utilizing the encoding scheme based, at least in part, on the one or more nonce values; and transmit, by the service provider, the encrypted account information to a device associated with a digital payment provider.

10. The system of claim 9, wherein transmitting the second notification, further comprising:

store the account information regarding the account opened for use on the digital payment platform; and generate the second notification based, at least in part, on the stored account information.

11. The system of claim 9, wherein the threshold attempt count limit is preconfigured for the partner distributed computing system.

12. The system of claim 9, further comprising:

monitor, one or more events regarding opening of a plurality of accounts for use on the digital payment platform, at specified time intervals; and transmit one or more notifications to the partner distributed computing system upon determining an update or a change in the one or more events.

13. A non-transitory computer readable medium storing a program causing a computer to execute a method comprising:

receiving, by an issuance service, a request from a device associated with at least one user, wherein the request includes opening an account for use on a digital payment platform;

transmitting, by the issuance service, a first notification regarding the request, via a service gateway, to an application server;

providing, by the service gateway, a secure application programming interface (API) abstraction layer configured to translate partner-specific API requests into a format compatible with the application server, wherein the secure API abstraction layer facilitates scalable communication between the application server and partner distributed computing system;

transmitting, by the application server, the first notification regarding the request to a mainframe system, wherein the application server monitors a database of the mainframe system for receiving a second notification;

transmitting, by the application server, the second notification regarding the request, via the service gateway, to the partner distributed computing system, wherein the second notification includes account information regarding the account opened for use on the digital payment platform;

determining, by the service gateway, a failure in receiving a confirmation from the partner distributed computing system within a pre-determined time threshold;

iterating, by the application server, a sequence of operations including (i) transmitting the second notification to the partner distributed computing system, (ii) registering a failure event upon detecting the failure in receiving the confirmation, and (iii) notifying the application server of the failure to increment an attempt count for transmitting the second notification based on a threshold attempt count limit;

determining, by the application server, to cease the attempt count for transmitting the second notification to the partner distributed computing system based on determining the threshold attempt count limit has been exceeded;

transmitting, by the partner distributed computing system, a request for additional information, via the service gateway, to the application server;

encrypting, by the application server, the additional information using an encoding scheme;

transmitting, by the application server, the encrypted additional information, via the service gateway, to the partner distributed computing system upon determining a timestamp associated with the request for additional information has not expired;

receiving, by the application server, the confirmation and one or more nonce values from the partner distributed computing system based, at least in part, on identification and association of the account with the at least one user;

encrypting, by a service provider via the encoding scheme, the account information based, at least in part, on the one or more nonce values; and transmitting, by the service provider, the encrypted account information to a device associated with a digital payment provider.

14. The non-transitory computer readable medium of claim 13, wherein transmitting the second notification, further comprising:

storing the account information regarding the account opened for use on the digital payment platform; and generating the second notification based, at least in part, on the stored account information.

15. The non-transitory computer readable medium of claim 13, wherein the threshold attempt count limit is preconfigured for the partner distributed computing system.

16. The method of claim 1, wherein the confirmation from the partner distributed computing system indicates receipt and transmission of the second notification to the digital payment platform.

17. The method of claim 1, wherein the application server monitoring the database of the mainframe system for receiving the second notification, further comprises:

determining, by the database of the mainframe system, an update in content of the database; and transmitting, by the database of the mainframe system, the second notification to a notification framework component of the application server based on the update of the content.

18. The method of claim 1, wherein the additional information includes one or more of a status code, a status message, an event count, an event type, or a timestamp data.

19. The method of claim 1, wherein incrementing the attempt count for transmitting the second notification to the partner distributed computing system comprises:

retransmitting, by the application server, the second notification, via the service gateway, to the partner distributed computing system upon each failure to receive the confirmation until the threshold attempt count limit is reached.

20. The method of claim 1, further comprising:

queuing the open account request in a queue component of the mainframe system; and generating an event based on the open account request in an event database of the mainframe system.

* * * * *